Patented Mar. 12, 1940

2,193,523

UNITED STATES PATENT OFFICE 2,193,523

VITAMIN PREPARATION

Fritz Schultz, I. G. Werk/Wuppertal-Elberfeld, Germany, assignor to Winthrop Chemical Company, Inc., New York, N. Y., a corporation of New York No Drawing. Application October 22, 1935, Serial No. 46,161. In Germany October 30, 1934

11 Claims. (Cl. 167—81)

This invention relates to a process for the manufacture of a vitamin preparation.

It is known that various animal organs contain a vitamin-like substance which is capable of preventing skin diseases of rats and which is likewise useful in treating skin diseases of human beings. Particularly rich in this biologically active substance, which has been designated as "vitamin H" by Paul Gyorgy in Zeitchrift fur arztliche Fortbildung, vol. 28, 1931, pages 377–380, in Pfaundler-Schlossman, Handbuch der Kinderheilkunde, vol. 10, pages 53–63 and in other places, are the liver and the kidneys. Inasmuch as this active substance is intracellularly bound in these organs and cannot for instance be obtained by extraction or pressing out, the active agent has been set free by proteolytic ferments. Such process, however, because of the properties of the decomposition products formed thereby, has various disadvantages. Likewise the yield is rather unsatisfactory.

The present invention is based on the discovery that by a hydrolysis of "vitamin H" containing substances at elevated temperatures the active substance is set free and becomes water-soluble. In accordance therewith a vitamin preparation influencing the metabolism of the skin can be obtained by subjecting "vitamin H" containing materials to a hydrolysis at elevated temperatures.

As "vitamin H" containing starting materials especially those of livers or kidneys, preferably fresh or dry livers or kidneys which have advantageously been finely minced, come into consideration.

The starting material may be subjected to hydrolysis as such or with the addition of diluents such as water, acetone, methyl- and ethyl alcohol. The addition of such diluents has proved to be especially advantageous when dry "vitamin H" containing substances are used as starting materials.

The hydrolysis may be effected with the addition of electrolytes, for instance such of neutral character such as sodium chloride or sulfate, ammonium chloride or sulfate or potassium chloride, or of electrolytes of acid character such as, for instance dilute hydrochloric, sulfuric, phosphoric, or acetic acid, or acid reacting salts, for instance sodium or potassium bisulfate, zinc chloride and iron sulfate, or of electrolytes of alkaline character such as for instance sodium, potassium- or magnesium hydroxide, baryta, milk of lime, sodium- or potassium carbonate or acetate, or secondary or tertiary alkali metal phosphates. The electrolytes added may also act as buffer substances as it is the case for instance with the primary and secondary alkali metal phosphates.

The hydrolysis is preferably carried out at temperatures above 100° C. Especially temperatures of from 120° C. to about 300° C., preferably between 140 and 250° C., have been found to be suitable. When working at temperatures above 100° C., the hydrolysis is advantageously carried out under pressure. Heating in an autoclave has proved to be most suitable.

After the hydrolysis has been accomplished, the hydrolysate may further be purified. The solution obtained may, for instance, be separated from the insoluble substances, whereupon the solution may be concentrated and/or subjected to further purification. For instance, the solution may be subjected to adsorption to an adsorbent, for instance charcoal, with subsequent elutriation, for instance by means of acetone, aqueous pyridine, mixtures containing pyridine, acetone and ethyl- or methyl alcohol or isopropyl alcohol, or secondary ammonium phosphate solution. In order to remove the ineffective accompanying substances, also a precipitation, for instance by means of heavy metal salts such as mercury chloride or sulfate, uranyl acetate or lead acetate may be put in. Also the active vitamin component may be precipitated by means of phosphotungstic acid, whereupon the precipitate is decomposed by means of baryta or milk of lime, and the baryta or milk of lime are removed by adding sulfuric acid.

The hydrolysis in acid or alkaline medium has provided to be especially advantageous, because it has been found that the solubility of "vitamin H" in organic solvents is substantially changed thereby so that the "vitamin H" becomes soluble in most of the organic solvents. This fact is the more surprising in so far as the "vitamin H", which has been set free from the "vitamin H" containing starting material by digestion with ferments or by heating, for instance with water, under pressure in a neutral medium, is scarcely soluble in organic solvents.

In accordance with a further feature of the present invention, a "vitamin H" prepartion can be obtained by subjecting the "vitamin H" containing starting material to a hydrolysis in an acid or alkaline medium at elevated temperatures and treating the hydrolysate with an organic solvent, for instance by disintegrating the aqueous hydrolysate with water-soluble organic solvents or extraction with organic solvents which are immiscible with water.

As organic solvents suitable for the disintegration the water-soluble lower aliphatic ketones such as acetone, methylethyl and diethyl ketone and water-soluble lower aliphatic alcohols, for instance methanol, ethanol or isopropanol come into consideration. Especially acetone has proved to be suitable.

Organic solvents which are suitable for the extraction process are especially liquid alcohols which are immiscible with water, for instance pentanol, isopentanol, butanols or carboxylic acid esters such as acetic acid ethyl ester and acetic acid methyl ester. Especially butanols, pentanols and acetic acid esters of lower aliphatic alcohols have proved to be suitable.

For the disintegration or the extraction also mixtures of the solvents may be used; for instance a mixture of propanol and acetone for the disintegration, or of pentanol, acetic acid ester and methylene chloride for the extraction. In certain cases also the addition of small amounts of ether has proved to be suitable.

Before the disintegration or the extraction it is to be recommended to neutralize the hydrolysate, for instance by the addition of a base, for instance caustic soda or potash solution, ammonia, pyridine or diethylamine in the case of acid hydrolysates, or of hydrochloric, sulfuric, acetic acid, etc. in the case of alkaline reacting hydrolysates.

If a "vitamin H" dry preparation is desired, the solution obtained in accordance with the afore-given directions can be evaporated to dryness, eventually in vacuo.

The solutions obtained by means of hydrolysis in an alkaline or acid medium and subsequent treatment with an organic solvent can be subjected to further purification processes, for instance to a precipitation of the "vitamin H" by means of phosphotungstic acid in acid medium, decomposition of the precipitate with baryta and removing the baryta by means of sulfuric acid. Also ineffective substances which still accompany the "vitamin H" may be removed by precipitation with uranyl or lead acetate, mercury sulfate, etc. The active vitamin component may also be adsorbed to an adsorbent such as charcoal, and the adsorbate elutriated by pyridine, acetone, mixtures of the said solvents with water-soluble lower aliphatic alcohols, or secondary ammonium phosphate solutions. The aforedescribed purification processes may also be inserted between the hydrolysis in alkaline or acid medium and the treatment with the organic solvents.

When hydrolizing in an alkaline or acid medium, also preparations in which the "vitamin H" has already been set free but is not yet soluble in organic solvents, for instance preparations obtained from "vitamin H" containing starting materials by papain digestion or by hydrolysis with water in a neutral medium at elevated temperatures under pressure may subsequently be subjected to the hydrolysis in an acid or alkaline medium and then be worked up by disintegration or extraction in the afore-indicated manner.

Subjecting of "vitamin H" containing preparations, in which the "vitamin H" is still intracellularly bound, for instance fresh or dried livers and kidneys, to a hydrolysis in acid or alkaline medium, preferably under pressure, has been found to be most advantageous.

The process of the present invention is distinguished over the known processes for the manufacture of "vitamin H" preparations by its simplicity and the small costs occasioned thereby.

In accordance with the present process, products of great purity are obtained in a very good yield.

The following examples illustrate the invention without limiting it thereto:

Example 1

5 kgs. of kidneys, finely minced in a cutting machine, are stirred with 5 litres of 4% hydrochloric acid and heated to 140° C. under 3.5 atmospheres in an autoclave while stirring. After three hours the solution is separated off and the residue again subjected to the same treatment. The combined solutions are concentrated, left standing for several days in a refrigerator and freed from separating ballast substances. The solutions contain the "vitamin H" of the starting material almost completely.

Example 2

5 kgs. of a liver powder, obtained by exhaustive extraction of disintegrated liver with 40% alcohol and subsequent drying, is heated with 15 litres of water in a stirring autoclave to 160° C. under 6 atmospheres for six hours. The solution is filtered with suction while hot and the residue is again subjected to the same treatment. The combined filtrates are concentrated in vacuo to 5 litres and brought to pH3 by means of hydrochloric acid. Dark, resinous masses separate from which the solution is filtered. The solution contains almost the whole "vitamin H" contained in the liver powder.

Example 3

5 kgs. of fresh kidneys are finely minced, subjected to a papaene digestion at pH5 and 70° C., extracted with water and concentrated to 5 litres after being separated from the undissolved parts. 2 litres of 50% sulfuric acid are added thereto, and the solution is kept boiling for 9 hours while stirring. After cooling the solution is adjusted to pH4 with an aqueous solution of caustic soda, concentrated until a weak syrupy consistency is attained, and gradually treated with three times the quantity of isopropanol while vigorously stirring. The solvent mixes with the concentrate in the proportion of about 1:1. On further addition oily dark greases separate, which finally settle at the bottom as viscous mud. The bright upper layer is separated, the solvent evaporated, and the residue dissolved in water. The solution contains 80–90% of the "vitamin H" contained in the kidney.

Example 4

5 kgs. of liver powder are heated in an autoclave with 20 litres of water for 6 hours to 180° C. while stirring. After cooling the solution is filtered with suction to remove the undissolved parts, concentrated to 5 litres and boiled for 6 hours with 2 litres of 50% sulfuric acid. Then the solution is neutralized with aqueous caustic soda solution, concentrated to about 4 litres, and, gradually, treated with 12 litres of acetone while vigorously stirring. The first 3–4 litres yield a clear solution with the concentrate. On further additions, a brown oil separates, which finally forms a dark viscous mud at the bottom. The acetone solution is separated, evaporated to dryness and the residue dissolved in hot water. On cooling a brown oil again separates. The aqueous part contains about 90% of the "vitamin H" contained in the liver powder.

Instead of adding 12 litres of acetone to the neutralized solution obtained by strong hydrolysis, also a mixture of about 7.2 litres of acetone and 4.8 litres of propanol may be added.

For further purification a precipitation with phosphotungstic acid may be introduced between the acid hydrolysis and the disintegration. The precipitate thus obtained is decomposed with baryta, the baryta is bound by the addition of a corresponding quantity of sulfuric acid and the barium sulfate separating is removed by filtration.

*Example 5*

5 kgs. of liver powder are heated in an autoclave with 15 litres of 15% sulfuric acid for 4 hours at 160° C. After cooling the solution is neutralized, without filtering, to a pH-value of 3.5 with aqueous caustic soda solution, concentrated to 10 litres and gradually treated with 40 litres of ethyl acetate while vigorously stirring. After two hours the yellow-colored ester is separated from the dark sediments, the solution is evaporated to dryness, and the residue dissolved in water. The solution thus obtained contains about 80% of the "vitamin H" contained in the liver powder.

*Example 6*

3 kgs. of liver powder are heated for 4 hours at 150° C. in an autoclave with 9 litres of 10% aqueous caustic soda solution. After cooling the gelatinous mass is washed out with water, acidified with concentrated hydrochloric acid to a pH-value of 3.5 and concentrated to 3 litres in vacuo. The syrupy solution is then treated, while vigorously stirring, with five times the quantity of acetone. The solution is filtered with suction from the gradually separating oily dark grease, the clear upper layer is evaporated to dryness, and the residue dissolved in hot water. After cooling the mixture, the undissolved parts are removed by filtration with suction. The solution contains 80% of the vitamin contained in the liver powder in a highly purified state.

By the expression "the vitamin characterized by the property of preventing skin diseases in rats" in the claims, is meant the biologically active substance described in the before-mentioned papers and which has been designated by the authors as "vitamin H."

We claim:

1. The process for the manufacture of a preparation containing the vitamin characterized by the property of preventing skin diseases in rats which comprises subjecting livers and kidneys to a hydrolysis at temperatures above 100° C. with the addition of an electrolyte of the group consisting of acid and alkaline reacting electrolytes.

2. The process for the manufacture of a preparation containing the vitamin characterized by the property of preventing skin diseases in rats which comprises subjecting livers and kidneys to a hydrolysis at temperatures between 140° C. and 250° C. under pressure with the addition of an electrolyte of the group consisting of acid and alkaline reacting electrolytes.

3. The process for the manufacture of a preparation containing the vitamin characterized by the property of preventing skin diseases in rats which comprises subjecting livers and kidneys to a hydrolysis at temperatures above 100° C. with the addition of an electrolyte of the group consisting of acid and alkaline reacting electrolytes, and treating the hydrolysate with an organic solvent.

4. The process for the manufacture of a preparation containing the vitamin characterized by the property of preventing skin diseases in rats which comprises subjecting livers and kidneys to a hydrolysis at temperatures from 120° C. to about 300° C. with the addition of an electrolyte of the group consisting of acid and alkaline reacting electrolytes, and treating the hydrolysate with an organic solvent.

5. The process for the manufacture of a preparation containing the vitamin characterized by the property of preventing skin diseases in rats which comprises subjecting livers and kidneys to a hydrolysis at temperatures from 120° C. to about 300° C. under pressure with the addition of an electrolyte of the group consisting of acid and alkaline reacting electrolytes, neutralizing the hydrolysate and treating the hydrolysate with an organic solvent.

6. The process for the manufacture of a preparation containing the vitamin characterized by the property of preventing skin diseases in rats which comprises subjecting livers and kidneys to a hydrolysis at a temperature above 100° C. with the addition of an electrolyte of the group consisting of acid and alkaline reacting electrolytes, and disintegrating the hydrolysate with a water-soluble organic solvent.

7. The process for the manufacture of a preparation containing the vitamin characterized by the property of preventing skin diseases in rats which comprises subjecting livers and kidneys to a hydrolysis at temperatures above 100° C. with the addition of an electrolyte of the group consisting of acid and alkaline reacting electrolytes, neutralizing the hydrolysate and disintegrating the same with a water-soluble organic solvent.

8. The process for the manufacture of a preparation containing the vitamin characterized by the property of preventing skin diseases in rats which comprises subjecting livers and kidneys to a hydrolysis at temperatures above 100° C. with the addition of an electrolyte of the group consisting of acid and alkaline reacting electrolytes, neutralizing the hydrolysate and disintegrating the same with acetone.

9. The process for the manufacture of a preparation containing the vitamin characterized by the property of preventing skin diseases in rats which comprises subjecting livers and kidneys to a hydrolysis at a temperature above 100° C. with the addition of an electrolyte of the group consisting of acid and alkaline reacting electrolytes and extracting the hydrolysate with organic solvents which are immiscible with water.

10. The process for the manufacture of a preparation containing the vitamin characterized by the property of preventing skin diseases in rats which comprises subjecting livers and kidneys to a hydrolysis at temperatures above 100° C. with the addition of an electrolyte of the group consisting of acid and alkaline reacting electrolytes, neutralizing the hydrolysate and extracting the same with an organic solvent which is immiscible with water.

11. The process for the manufacture of a preparation containing the vitamin characterized by the property of preventing skin diseases in rats which comprises subjecting livers and kidneys to a hydrolysis at temperatures from 120° C. to about 300° C. under pressure with the addition of an electrolyte of the group consisting of acid and alkaline reacting electrolytes, neutralizing the hydrolysate and extracting the same with an organic solvent which is immiscible with water.

FRITZ SCHULTZ.